United States Patent
Bremont et al.

(10) Patent No.: US 6,939,421 B2
(45) Date of Patent: Sep. 6, 2005

(54) DEVICE FOR SETTING AND BONDING FASTENERS ONTO SUPPORT SURFACES

(75) Inventors: Michel Bremont, Attenschwiller (FR); Yannick Leroux, Mulhouse (FR); Olivier Schuller, Huningue (FR)

(73) Assignee: A. Raymond & CIE, Grenoble (FR)

( * ) Notice: Subject to any disclaimer, the term of this patent is extended or adjusted under 35 U.S.C. 154(b) by 456 days.

(21) Appl. No.: 10/169,714

(22) PCT Filed: Dec. 19, 2000

(86) PCT No.: PCT/EP00/12937
§ 371 (c)(1),
(2), (4) Date: Jul. 8, 2002

(87) PCT Pub. No.: WO01/51579
PCT Pub. Date: Jul. 19, 2001

(65) Prior Publication Data
US 2003/0010441 A1 Jan. 16, 2003

(30) Foreign Application Priority Data
Jan. 7, 2000 (DE) ........................ 100 00 355

(51) Int. Cl.$^7$ .............................................. B32B 31/20
(52) U.S. Cl. .................... 156/66; 156/299; 156/320; 156/322; 156/497; 156/499
(58) Field of Search ............................ 156/66, 91, 297, 156/299, 320, 321, 322, 381, 391, 497, 499, 574, 580, 583.1; 432/10, 58, 121, 201

(56) References Cited

U.S. PATENT DOCUMENTS 3,873,029 A    3/1975  Mihaly
4,094,725 A  *  6/1978  Takeda et al. ............... 156/497
4,478,669 A  * 10/1984  Zeller et al. ............. 156/379.7
4,778,702 A  * 10/1988  Hutter, III .................. 428/40.9
4,822,656 A  *  4/1989  Hutter, III .................. 428/41.8
5,414,247 A  *  5/1995  Geithman et al. .......... 219/667
5,756,185 A     5/1998  Lesser
6,221,195 B1 *  4/2001  Lubert et al. ............ 156/275.7

FOREIGN PATENT DOCUMENTS

FR          2 144 867 A     2/1973
WO          WO98/12016      3/1998

* cited by examiner

Primary Examiner—Gladys JP Corcoran
(74) Attorney, Agent, or Firm—Gifford, Krass, Groh, Sprinkle, Anderson & Citkowski P.C.

(57) ABSTRACT

The present invention is used for setting and bonding fasteners to support surfaces. The fasteners are provided with connecting surfaces which are coated with a dry hot-melt-type adhesive on the bare side thereof. The adhesive can be reactivated by means of heat treatment. The setting device includes a housing (1) having a receiving component (2) that is displaceably guided therein and is used for the fastener (3) as well as means for quickly heating the hot-melt-type adhesive, lowering the receiving component (2) and pressing the adherent (25) after the adhesive has been melt on. Heating is carried out by means of hot air (H) which is supplied passing the housing (1) and in that the receiving component (2) is surrounded by a closed wall (7) that extends from the hot air discharge location in the housing (1) to the fastener (3). The hot air (H) can thus be conveyed to the adhering hot-melt-type adhesive before or while the fastener (3) rests on the support surface (25).

8 Claims, 4 Drawing Sheets

DEVICE FOR SETTING AND BONDING FASTENERS ONTO SUPPORT SURFACES

BACKGROUND OF THE INVENTION

The invention pertains to a device for setting and bonding holding elements or fasteners onto support surfaces, wherein the holding elements or fasteners are provided with connecting surfaces, the exposed side of which is coated with a dry hot-melt adhesive that can be reactivated under the influence of heat. This device comprises a housing with a receiver part for the fastener that is movably guided in the housing, and a means for rapidly heating the hot-melt adhesive and lowering the receiver part, as well as pressing on the adhesion surface after the adhesive has melted.

A device of this type for automatically setting holding bolts is known from WO 98/12016. In this case, the holding bolts are placed on the support surface by a robot to be exactly perpendicular. The holding bolts are transported to the bolt receiver part through a feed channel and sufficiently heated by an induction coil surrounding the receiver part such that the hot-melt adhesive melts and the holding bolt can subsequently be pressed onto the support surface.

This setting device is especially designed for holding bolts with circular discs and is only suitable for use with metallic bolts due to the inductive heating process. In addition, it is unsuitable for manual use because the adhesion surface needs to be placed on the support surface absolutely plane-parallel in order to achieve the desired bonding effect. The adhesive on the connecting surface of the fastener is unable to obtain the required contact with the support surface if the displacement axis of the housing is only slightly inclined relative to the support surface. In this case, the fastener would also not be arranged exactly perpendicular to the support surface such that secure mounting of a functional or structural component using the fastener would be jeopardized.

SUMMARY OF THE INVENTION

The invention is based on the objective of designing a setting device of the initially described type such that it can be universally utilized for holding elements or fasteners with adhesion surfaces and, if so required, can also be manually placed perpendicular to the support surface and securely held until the fastener is bonded to the support surface.

In the setting device according to the invention, this objective is attained due to the fact that the heating process is realized by means of hot air that is supplied via the housing and directly conveyed to the hot-melt adhesive around the receiver part. The receiver part is surrounded by a closed wall that extends from the hot-air outlet in the housing up to the fastener.

A rapid heating process can be realized because the hot air is directly conveyed to the hot-melt adhesive. In this case, it is important that the receiver part be surrounded by a closed wall that extends up to the fastener. This makes it possible to rapidly and securely attach fasteners that have differently designed adhesion surfaces and consist of metal or plastic.

The design of the closed wall makes it possible to convey the hot air to the adhesion surface of the fastener in a directional fashion such that the adhesive melts as quickly as possible. The installation of a dome-shaped receiver head for holding the receiver part makes it possible to insert fasteners of different geometries into the receiver part and thus to broaden the scope of application of the setting device.

The transversely extending bore provided advantageously makes it possible to convey cooling air to the end of the fastener that is inserted into the receiver part, such that heating is limited to the adhesion surface. In addition, the cooling air makes it possible to attract the end of the fastener that is inserted into the recess of the receiver part by suction, according to the Venturi principle, and to release this end of the fastener again by switching off the supply of cooling air.

In order to allow the manual use of the setting device, it is practical, according to another characteristic of the invention, to connect the cylindrical body to three axially parallel support rods via a carrier plate. Due to these measures, the fastener that is clamped in the receiver part can be held in plane-parallel contact with the support surface while the adhesive is heated.

DETAILED DESCRIPTION OF THE PREFERRED EMBODIMENTS

Figure 1:
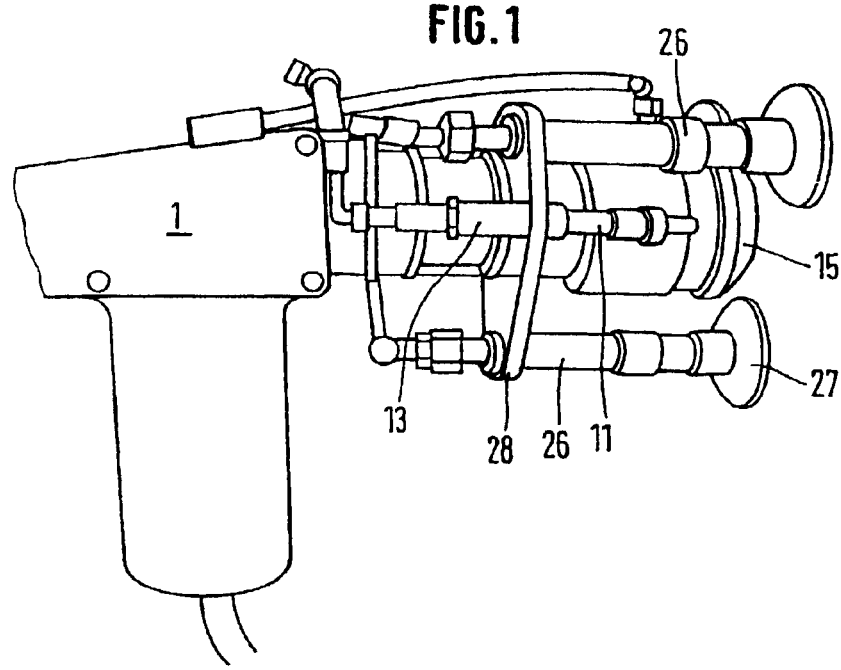
FIG. 1 is a perspective view of a setting device in the setting position on a support surface.

The device shown in FIG. 1 serves to manually place and bond holding elements such as fasteners on support surfaces, e.g., sheet metal of car bodies and household appliances, housing walls of electric appliances, window panes, or other support plates. In this case, the holding elements or fasteners are provided with essentially planar connecting surfaces, the exposed side of which is coated with a dry hot-melt adhesive that can be reactivated under the influence of heat.

The setting device essentially consists of an easily manageable housing 1 with the receiver part 2 for a fastener 3, which is movably guided in the housing, driving means for lowering the receiver part 2 and pressing the fastener 3 onto the support surface 32, and a hot-air blower that is arranged in the housing and serves to heat the hot-melt adhesive applied to the fastener 3.

Figure 2:
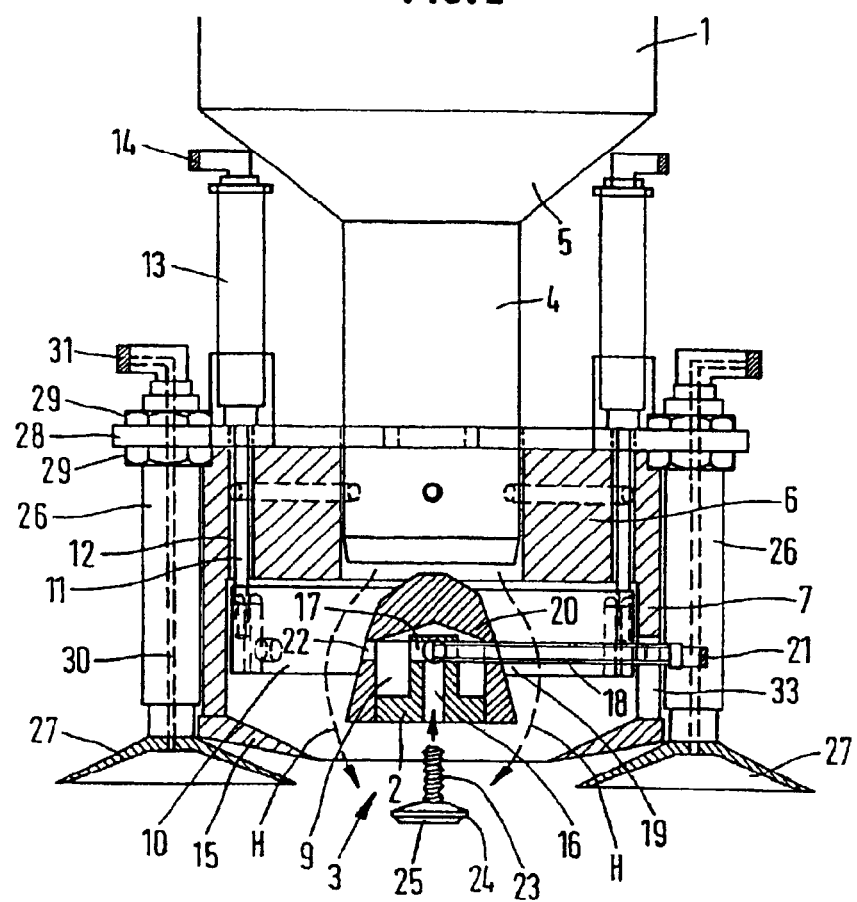
FIG. 2 is an enlarged sectional view of the head of the setting device before inserting the fastener.
Figure 3:
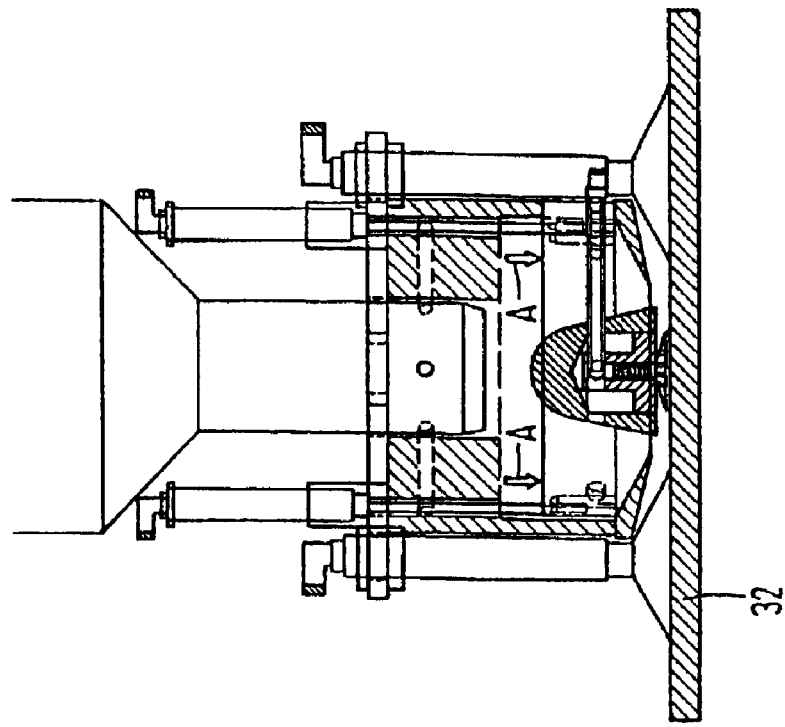
FIG. 3 illustrates the setting head with inserted fastener while setting the fastener onto the support surface.
Figure 4:
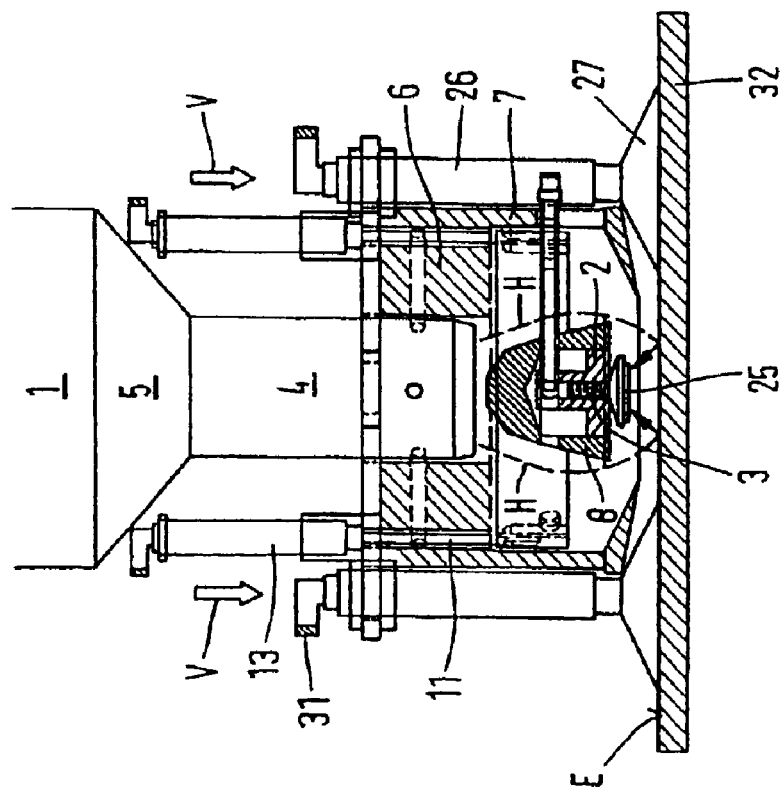
FIG. 4 illustrates the setting head after the setting process, namely while pressing the fastener onto the support surface.

The design of the setting device and its function are described in greater detail below, with reference to FIGS. 2–4. FIG. 2 shows an enlarged representation of the lower part of the setting device, with a fastener 3 according to FIG.

5 clamped therein. FIG. 3 shows the receiver part 2 before attachment to the support surface 32, and FIG. 4 shows this receiver part after attachment, while the fastener 3 is pressed onto the support surface 32.

FIG. 2 also shows that the lower end of the housing 1 is connected to a pipe section 4, of reduced diameter, by means of an intermediate wall 5 that is tapered in the shape of a funnel. This pipe section is connected to a cylindrical body 6 at its lower end, wherein said cylindrical body is downwardly extended by a cylindrical outer wall 7. A dome-shaped receiver head 8 with a central recess 9 for holding the receiver part 2 is situated within the cylindrical wall 7. The receiver head 8 is connected to the ends of piston rods 11 by means of transverse braces 10, wherein the piston rods are movably guided in bores 12 of the cylindrical body 6. The piston rods 11 are guided in cylinders 13 that can be charged with compressed air via air inlet connections 14. The cylindrical wall 7 ends underneath the receiver head 8 in the form of a rim 15 that is directed inward in the shape of a funnel, and the inside diameter of which is slightly larger than the outside diameter of the holding head 8 such that this can be a lowered onto the support surface 32 in an unobstructed fashion through the hole in the inner rim 15.

The receiver part 2 contains a central recess 16 that is open toward the bottom and ends in the form of a transversely extending bore 17 at its upper end. One side of this bore 17 is connected to a ventilation pipe 18 that extends outward through a hole 19 in the dome-shaped wall 20 and through a vertically extending oblong recess 33 in the cylindrical outer wall 6, and that is provided with an air inlet connection 21 for introducing external cooling air.

On the side opposite from the ventilation pipe 18, another hole 22 for discharging the cooling air introduced through the ventilation pipe 18 is arranged in the dome-shaped wall 20. This simultaneously causes a suction effect, for attracting the inserted fastener 3, to be generated in the recess 16 according to the so-called Venturi principle. The fastener may, for example, consist of a threaded bolt shown in FIG. 5.

The threaded bolt usually consists of a threaded shaft 23 that can be connected to a structural component by means of a corresponding threaded receptacle, and of a circular disc 24 that is integrally formed onto the threaded shaft. On its exposed underside, this circular disc has an essentially plane connecting surface 25 that is coated with a dry hot-melt adhesive that can be reactivated under the; influence of heat.

According to FIG. 2, the fastener 3 that is realized in the form of a threaded bolt is inserted into the recess 16 of the receiver part 2 with its threaded shaft 23 and is initially held by friction, wherein the shaft diameter exactly corresponds to the clear inside diameter of the recess 16. A supplementary suction effect for securely retaining the shaft 23 can be realized according to the Venturi principle by introducing cooling air through the ventilation pipe 18.

In order to also allow the manual use of the setting device, the cylindrical body 6 that is connected to the housing pipe section 4 is preferably also connected to axially parallel support rods 26, the free ends of which contain funnel-shaped suction cups 27. In order to ensure a stable support without shaking, a total of three support rods 26 are distributed around the circumference, wherein the upper ends of the support rods are rigidly screwed to a carrier plate 28 that, in turn, is rigidly connected to the cylindrical body 6 by means of bolts 29 that engage on both sides.

The interior of the respective support rods 26 contains a bore 30 that extends downward into the suction feet or cups 27 and ends in the form of a connection fitting 31 at its upper end. Suction lines, not shown, can be connected to these connection pieces 31 in order to generate a vacuum in the suction cups 27 after placing the device to the support surface 32. In this case, the plane of contact "E" of the suction cups 27 is aligned exactly perpendicular to the displacement direction "V" of the receiver head 8. This ensures, when lowering and pressing on the receiver head 8 in the direction of the arrows "A," that the connecting surface 25 of the inserted fastener 3 is held in plane-parallel contact with the support surface 32 after the fastener is placed onto the support surface 32 (see FIG. 4), and in fact long enough that sufficient adhesive connection is produced. In this context, the term sufficient refers to a state in which a functional stability is reached that allows uncomplicated transport of the bonded part.

The adhesion surface 25 is heated by means of hot air that is conveyed by a not-shown hot-air blower and that emerges from the reduced pipe section 4 of the housing 1. The heating process takes place in two phases. In the first phase, or so-called pre-heating phase, the hot air is, after insertion of the fastener 3, conveyed to the hot-melt adhesive on the connecting surface 25 around the receiver head 8 according to the broken lines "H" as indicated in FIG. 2, namely before attachment to the support surface 32. This pre-heating phase may require a few seconds.

The second phase of the heating process begins after positioning and placing the setting device at the predetermined location on the support surface 32. FIG. 3 shows that the hot air "H" is blown onto the support surface 32 such that the support surface is also heated. The hot air is simultaneously reflected upward such that it is directed onto the connecting surface 25 from below. This causes the hot-melt adhesive to be very rapidly heated to the required melting temperature, and the fastener 3 can subsequently be lowered by means of the piston rods 11 and the receiver head 8 and pressed onto the support surface 32, as shown in FIG. 4.

Figure 6:
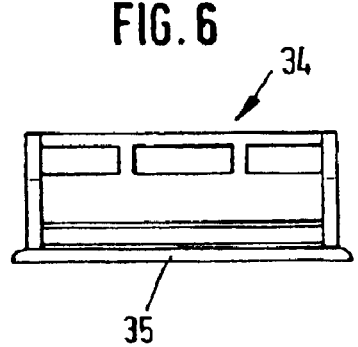
FIG. 6 is a side view of an alternative fastener with a rectangular adhesion surface.
Figure 7:
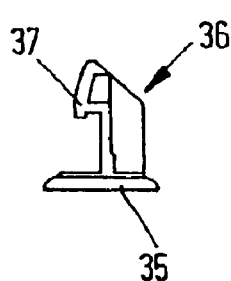
FIG. 7 is a front view of the alternative fastener.

FIGS. 6 and 7 show another fastener 34 that has a rectangular adhesion surface 35 that, for example, needs to be bonded to the edge of a kitchen sink basin 42, specifically to its underside, that is partially indicated in FIGS. 9–12. An elongated mounting part 36 is integrally formed in perpendicular fashion on the adhesion surface 35, wherein said mounting part has a projecting catch tip 37 at its upper edge. A holding clamp, not shown, for mounting the sink 42 in a counter top can be fastened on and anchored to this catch tip.

Figure 5:
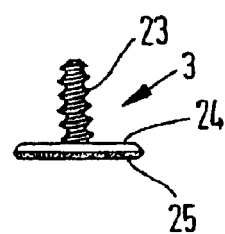
FIG. 5 is a side view of a fastener with a threaded bolt and a circular disc that serves as the adhesion surface.
Figure 8:
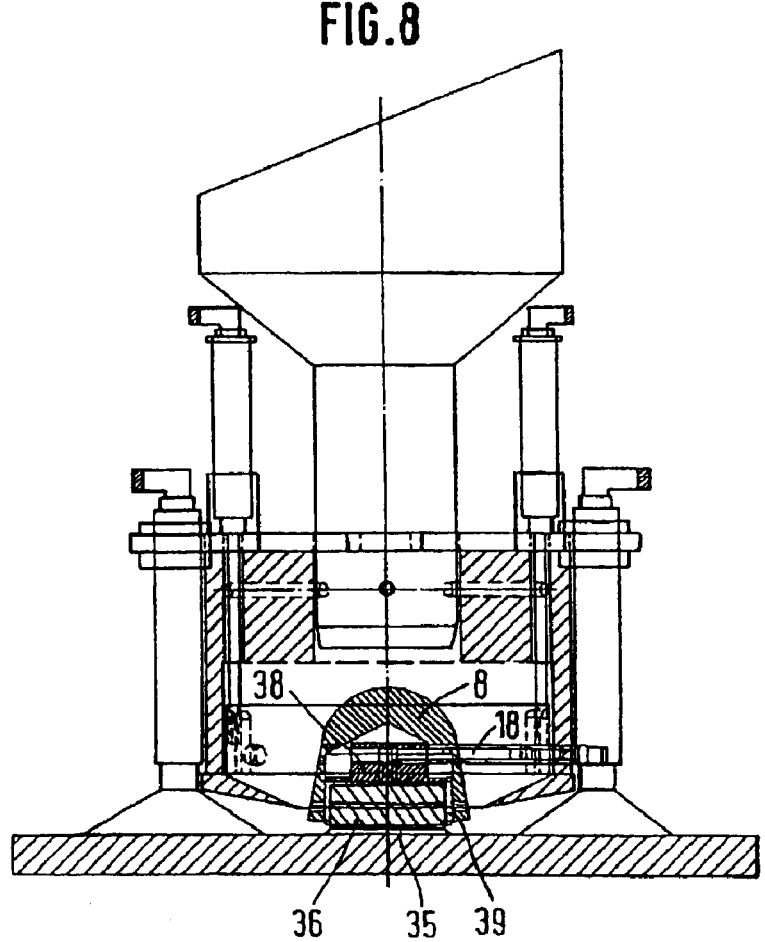
FIG. 8 is the setting head of the alternative fastener as the one shown in FIG. 2, wherein the receiver part for receiving a fastener is designed in accordance with FIGS. 6 and 7, after setting and pressing on the fastener.

FIG. 8 indicates that this specially shaped fastener 34 can be manually placed and bonded onto a support surface with the same setting device as is the fastener according to FIG. 5. However, a different receiver part 38 needs to be inserted into the receiver head 8, wherein the receiver part contains a corresponding oblong recess 39, the geometry of which is suitably shaped to receive the mounting part 36.

Figure 9:
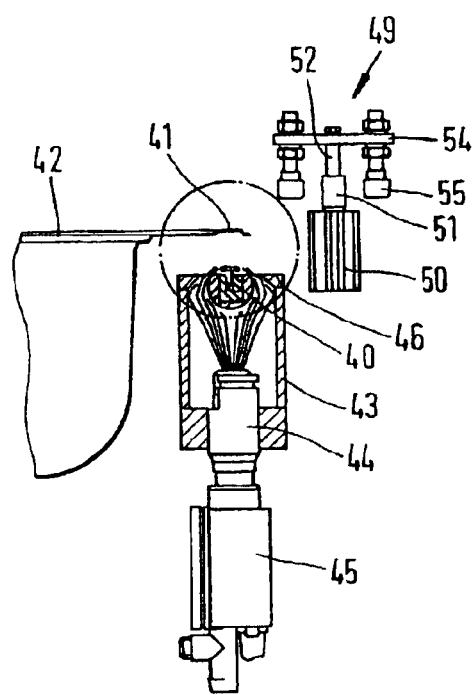
FIG. 9 illustrates the head of another setting device with inserted fastener, while heating the adhesion surface and the support plate.
Figure 10:
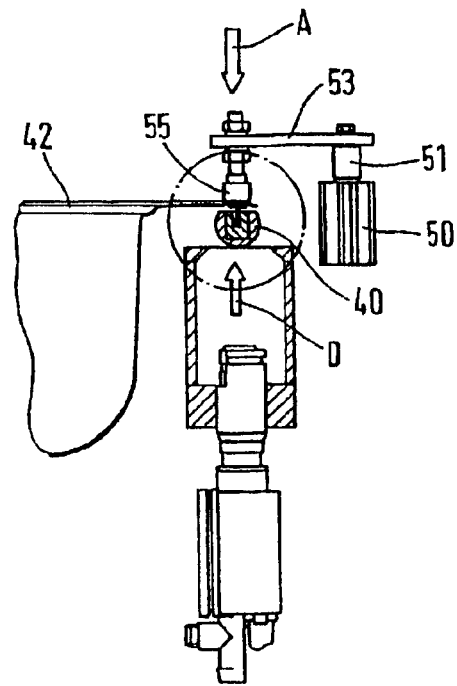
FIG. 10 illustrates the same head while pressing the fastener onto the support plate.

FIGS. 9 and 10 show the receiver head 40 of another setting device that is arranged in a vertically movable fashion underneath the edge 41 of a sink 42, and is especially designed for automatically setting the fasteners 34. As with the previously described setting device, this receiver head 40 is surrounded by a closed wall 43 that is mounted on the head 44 of a hot-air blower 45 and extends up to the receiver head 40.

Figure 11:
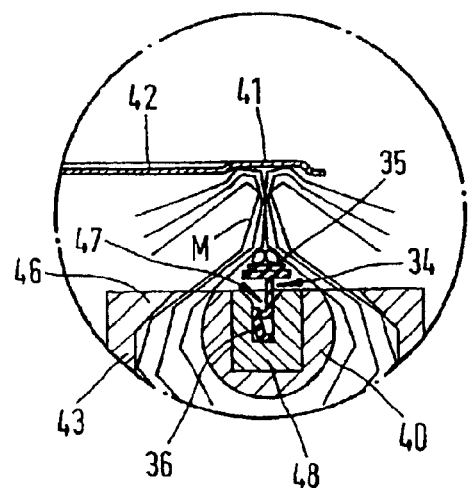
FIG. 11 is an enlarged detail of the head shown in FIG. 9.

The enlarged detail of the setting device shown in FIG. 11 indicates that the upper rim 46 of the wall 43 that surrounds the receiver head 40 converges in the shape of a funnel until it reaches the outer contour of the receiver head 40. As a result, the hot air H is focused and directed onto the adhesion surface 35 of the fastener 34 clamped in the receiver head 40 and onto the underside of the edge 41 of the sink 42. The mounting part 36 of the fastener 34 is clamped in the oblong recess 47 of the receiver part 48 that, in turn, is securely embedded in the receiver head 40.

Figure 12:
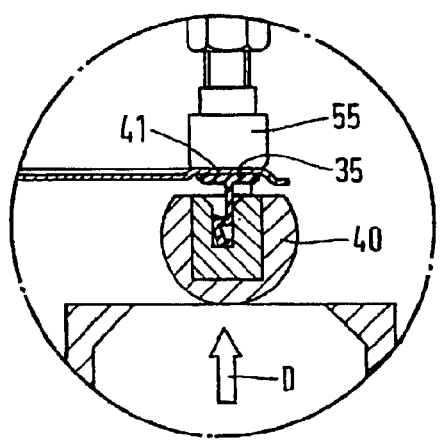
FIG. 12 is an enlarged detail of the head shown in FIG. 10.

A pressing device 49 is stationarily arranged laterally above the receiver head 40, wherein said pressing device essentially consists of a pivot drive 50 and a pneumatically actuated compressed air cylinder 51 with a vertically guided piston 52. A horizontally projecting lever 53 (FIG. 10) is mounted on the piston end, wherein the free end of said lever is rigidly connected to a transversely extending beam 54 (FIG. 9). This beam 54 is connected to plungers 55 on both of its ends, wherein said plungers are swiveled by the pivot drive 50 from the waiting position shown in FIG. 9 over the edge 41 of the sink 42, and are then lowered in the direction of the arrow "A" into the contact position on the edge 41 of the sink 42, as is shown in FIGS. 10 and 12, by the compressed air cylinder 51. The receiver head 40 is simultaneously pressed in the direction of the arrow "D" against the edge 41 from the bottom.

Since the sink 42 normally needs to be equipped with several fasteners 34 along its edge 41, the combination consisting of the receiver head 40 and the pressing device 49 may be placed into a suitable frame, not shown, at the predetermined locations of the sink edge 41 in order to simultaneously set the fasteners 34. In this case, it is practical to arrange the hot-air blower 45 centrally underneath the blower heads 44 and to connect the hot-air blower to the blower heads by means of hoses.

The automated setting and bonding of fasteners 3 onto support surfaces 32 is advantageously achieved by means of the following steps:

inserting the fastener 3 by introducing the holding part 23 that projects from the adhesion surface 25 into the correspondingly shaped recess 16 of the receiver part 2, positioning the receiver head 8 at the predetermined location on the support surface 32 and lowering the receiver head 8, heating the support surface 32 while simultaneously reflecting the hot air back onto the adhesion surface 25, pressing the fastener 3 onto the support surface 32 and keeping the fastener there until a sufficient adhesive connection is produced, and removing the setting device from the support surface.

When manually setting and bonding fasteners onto support surfaces by utilizing a setting device with three support rods 26, the previously described process can be supplemented by the following steps:

generating a negative pressure in the suction cups 27 while lowering the receiver head 8, and venting the suction cups 27 before removing the setting device from the support surface 32.

What is claimed is:

1. A method for automatically placing and bonding a fastener onto a support surface by utilizing a setting device, said method comprising the steps of:

inserting a fastener into a correspondingly shaped recess of a receiver;

positioning the receiver at a predetermined location with respect to the support surface and lowering the receiver;

heating the support surface with hot air while simultaneously reflecting the hot air back onto an adhesion surface of the fastener;

pressing the fastener onto the support surface and keeping the fastener there until a sufficient adhesive connection is produced; and removing the setting device from the support surface.

2. A method of manually placing and bonding a fastener having a projection and an adhesion surface onto a support surface utilizing a setting device, said method comprising the steps of:

inserting a fastener by introducing the projection of the fastner into a correspondingly shaped recess of a receiver;

positioning the receiver at a predetermined location with respect to the support surface and lowering the receiver;

generating a negative pressure in a suction foot while lowering the receiver;

heating the support surface with hot air while simultaneously reflecting the hot air back onto the adhesion surface;

pressing the fastener onto the support surface and holding the fastener until an adhesive connection is produced; and venting the suction foot before removing the setting device from the support surface.

3. The method of claim 2 wherein the step of generating a negative pressure in the suction foot further includes the step of introducing cooling air into a transversely extending ventilation pipe.

4. A device for mounting a fastener onto a support surface, the fastener having a connecting surface coated with a dry hot-melt adhesive which is activated by heat, said device comprising:

a housing having a passage defined by a wall;

a receiver adapted to receive the fastener, the receiver guided for movement in said passage of said housing;

a means for heating the adhesive on the fastener, the means for heating including delivering hot air into the passage around the receiver while said receiver is spaced apart from the support surface; and means for lowering the receiver to press the connecting surface and adhesive onto the support surface.

5. The setting device according to claim 4 wherein the wall includes a lower rim converging in the shape of a funnel.

6. The setting device according to claim 4 wherein the receiver is interchangeably held by a receiver head.

7. The setting device according to claim 6 wherein the receiver includes a recess that connects with a transversely extending bore at an upper end.

8. The setting device according to claim 7 further including a cylindrical body connected to a support rod by a carrier plate, wherein the support rod contains a suction foot, such that the plane of contact of said suction foot is aligned perpendicular to a displacement direction of the receiver head.

* * * * *

UNITED STATES PATENT AND TRADEMARK OFFICE
CERTIFICATE OF CORRECTION

| | |
|---|---|
| PATENT NO. | : 6,939,421 B2 |
| APPLICATION NO. | : 10/169714 |
| DATED | : September 6, 2005 |
| INVENTOR(S) | : Michel Brement et al. |

It is certified that error appears in the above-identified patent and that said Letters Patent is hereby corrected as shown below:

Column 3, line 46, replace "the;" with --the--

Signed and Sealed this

Twenty-third Day of March, 2010

David J. Kappos
*Director of the United States Patent and Trademark Office*